(12) United States Patent
Cassett et al.

(10) Patent No.: US 8,245,315 B2
(45) Date of Patent: Aug. 14, 2012

(54) REMOTE DIAGNOSIS OF UNAUTHORIZED HARDWARE CHANGE

(75) Inventors: Tia Manning Cassett, San Diego, CA (US); Kenny Fok, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 12/207,981

(22) Filed: Sep. 10, 2008

(65) Prior Publication Data
US 2010/0064379 A1 Mar. 11, 2010

(51) Int. Cl.
*G06F 21/02* (2006.01)
(52) U.S. Cl. ............... 726/34; 726/35; 726/26; 726/27; 726/28
(58) Field of Classification Search .............. 726/34
See application file for complete search history.

(56) References Cited

U.S. PATENT DOCUMENTS

| | | | | |
|---|---|---|---|---|
| 5,388,212 | A * | 2/1995 | Grube et al. ............ | 726/22 |
| 5,469,569 | A * | 11/1995 | Grube et al. ............ | 1/1 |
| 7,046,635 | B2 | 5/2006 | Master et al. | |
| 7,367,063 | B1 * | 4/2008 | O'Toole, Jr. ............ | 726/34 |
| 7,798,395 | B2 * | 9/2010 | Ramachandran et al. | 235/379 |
| 7,818,729 | B1 * | 10/2010 | Plum et al. ............ | 717/140 |
| 7,992,777 | B1 * | 8/2011 | Block et al. ............ | 235/379 |
| 2003/0235125 | A1 * | 12/2003 | Akita .................. | 369/53.21 |
| 2004/0128260 | A1 * | 7/2004 | Amedure et al. ....... | 705/75 |
| 2006/0026441 | A1 * | 2/2006 | Aaron ................. | 713/187 |
| 2006/0242696 | A1 * | 10/2006 | Cruzado et al. ........ | 726/16 |
| 2007/0004483 | A1 * | 1/2007 | Imura ................. | 463/7 |
| 2007/0124818 | A1 * | 5/2007 | Bumiller et al. ........ | 726/26 |
| 2007/0266447 | A1 * | 11/2007 | Hollander ............. | 726/34 |
| 2008/0016001 | A1 * | 1/2008 | Nakano et al. ........ | 705/58 |
| 2008/0039209 | A1 * | 2/2008 | Chen et al. ........... | 463/42 |
| 2008/0123124 | A1 * | 5/2008 | Smithson ............. | 358/1.13 |
| 2008/0208921 | A1 * | 8/2008 | Bumiller et al. ........ | 707/201 |
| 2009/0183245 | A1 * | 7/2009 | Simpson et al. ........ | 726/7 |
| 2009/0204701 | A1 * | 8/2009 | Herzog et al. ......... | 709/224 |
| 2009/0222349 | A1 * | 9/2009 | Burger et al. ......... | 705/14 |
| 2009/0249460 | A1 * | 10/2009 | Fitzgerald et al. ...... | 726/7 |
| 2009/0253408 | A1 * | 10/2009 | Fitzgerald et al. ...... | 455/411 |
| 2009/0253410 | A1 * | 10/2009 | Fitzgerald et al. ...... | 455/411 |
| 2010/0031043 | A1 | 2/2010 | Burger et al. | |
| 2010/0057876 | A1 | 3/2010 | Yu | |

(Continued)

FOREIGN PATENT DOCUMENTS
WO WO 2007053175 A1 * 5/2007

(Continued)

OTHER PUBLICATIONS

Newman, "Cybercrime, Identity Theft and Fraud: Practicing Safe Internet—Network Security Threats and Vulnerabilities," 2006, ACM, pp. 68-78.*

(Continued)

*Primary Examiner* — Luu Pham
(74) *Attorney, Agent, or Firm* — Darren M. Simon

(57) ABSTRACT

Aspects describe remotely diagnosing unauthorized hardware changes on a mobile device. The changes can be identified based on hardware component identification and/or based on behavior characteristics of the device. If an unauthorized change is detected, information relating to that change can be reported to a service provider. Further, actions associated with the authorized change can be automatically implemented or implemented after confirmation to proceed with the recommended action.

23 Claims, 9 Drawing Sheets

U.S. PATENT DOCUMENTS

2010/0074315 A1    3/2010  Hahn

FOREIGN PATENT DOCUMENTS

WO    WO 2007096286 A1 *  8/2007

OTHER PUBLICATIONS

Paar et al., "Embedded Security in a Pervasive World," 2007, Elservier Ltd., pp. 155-161.*
Abrams et al., "Trusted System Concepts," 1995, Elsevier Science Ltd., pp. 45-56.*
Garfinkel et al., "Terra: A Virtual Machine-Based Platform for Trusted Computing," Oct. 2003, ACM, pp. 193-207.*
Molho, "Hardware Aspects of Secure Computing," 1970, System Development Corporation, pp. 135-142.*
Nicholson et al., "Mobile Device Security Using Transient Authentication," 2006, IEEE, pp. 1489-1493.*
Walter, "Secure Mobile Business Applications—Framework, Architecture and Implementation," 2004, Elsevier Ltd., pp. 6-22.*
Clarke et al., "Authenticating Mobile Phone Users Using Keystroke Analysis," 2006, Springer-Verlag, pp. 1-14.*
Patwardhan et al., "Enforcing Policies in Pervasive Environments," 2004, IEEE, pp. 1-10.*
Dodgson, "Mobile Termial Security and Tracking," 2004, Elsevier Ltd., pp. 60-80.*
Jansen et al., "A Unified Framework for Mobile Sevice Security," 2006, NIST, pp. 1-6.*
International Search Report and Written Opinion—PCT/US2009/056550, International Search Authority—European Patent Office—Dec. 8, 2009 (060379WO).

* cited by examiner

REMOTE DIAGNOSIS OF UNAUTHORIZED HARDWARE CHANGE

BACKGROUND

I. Field

The following description relates generally to mobile devices and more particularly to hardware changes on a mobile device.

II. Background

Technological advances have resulted in smaller and more powerful personal computing devices. For example, there exists a variety of portable personal computing devices, including wireless computing devices, such as portable wireless telephones, personal digital assistants (PDAs) and paging devices that are each small, lightweight, and can be easily carried by users. Consumers are increasingly offered many types of electronic devices that can be provisioned with an array of software applications and hardware devices. Distinct features such as email, Internet browsing, game playing, address book, calendar, media players, electronic book viewing, voice communication, directory services, and so forth, increasingly are selectable applications that can be loaded on a multi-function device, such as a smart phone, portable game console, hand-held computer, and so on.

With these technological advances, more and more people desire more and more features to be associated with the personal computing devices. For example, increased memory capabilities, increased processing speed, longer battery life, and so forth are being demanded. However, at times a demand for these added features might not correspond with a desire to purchase those features. As such, some personal computing devices might be modified to include features that are not authorized by a device manufacture, service provider, and the like, which can result in associated losses experienced by such entities. In some other situations, unauthorized changes can result in damage to the device and/or injury to the device user. Thus, there exists a need in the art to monitor for such unauthorized changes to mitigate loss to the device user as well as other entities associated with providing device services.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with detecting unauthorized hardware changes on a mobile device. The unauthorized change is defined by a configurable policy and a control or restriction can be applied to the device based on the configurable policy and the type of unauthorized change.

According to an aspect is a method for diagnosing an unauthorized hardware change. The method includes detecting a hardware change on a mobile device and determining the hardware change is an unauthorized change. The method also includes performing an action based on the unauthorized change.

Another aspect relates to a wireless communications apparatus that includes a memory and a processor. The memory retains instructions related to detecting a change on a mobile device, ascertaining the change is unauthorized, and performing an action based on the unauthorized change. The processor is coupled to the memory and configured to execute the instructions retained in the memory.

Still another aspect relates to a wireless communications apparatus that detects an unauthorized change to a device. The wireless communications apparatus includes a means for identifying a change to a device and a means for establishing that the change is unauthorized. The wireless communications apparatus also includes a means for implementing an action based on the unauthorized change.

Yet another aspect relates to a computer program product that includes a computer-readable medium. The computer-readable medium includes a first set of codes for causing a computer to detect a change on a mobile device based on a component identification, a behavior characteristic, or combinations thereof. The computer-readable medium also includes a second set of codes for causing the computer to determine the change is unauthorized and a third set of codes for causing the computer to perform an action based on the unauthorized change. The action includes transmitting information to a user, to a service provider, or to both the user and the service provider.

Another aspect relates to at least one processor configured to diagnose an unauthorized change. The processor includes a first module for identifying a change on a device and a second module for establishing that the change is unauthorized. The processor also includes a third module for communicating information to a user, a service provider, or to both the user and the service provider and a fourth module for selectively implementing an action as a function of a policy associated with the unauthorized change, a user response, a service provider response, or combinations thereof.

Another aspect relates to a method for remotely diagnosing changes to a mobile device. The method includes receiving notification that an unauthorized change has been made to a mobile device. The notification includes a recommended action. The method also includes evaluating the unauthorized change and the recommended action as a function of an implementation policy and communicating an approval or rejection of the recommended action to the mobile device.

Yet another aspect relates to a wireless communications apparatus that includes a memory and a processor. The processor is coupled to the memory and is configured to execute the instructions retained in the memory. The memory retains instructions related to receiving from a mobile device a recommended action to be performed based on an unauthorized change implemented on the mobile device, evaluating the unauthorized change and the recommended action as a function of implementation policy, and sending approval or rejection of the recommended action.

Still another aspect relates to a wireless communications apparatus that remotely detects unauthorized changes on a device. The wireless communications apparatus includes a means for receiving notification that an unauthorized change has been made to a device, the notification includes a recommended action. The unauthorized change is a hardware change, a circuitry change, or combinations thereof. The wireless communications apparatus also includes a means for reviewing the unauthorized change and the recommended action as a function of implementation policy and a means for communicating an approval or rejection of the recommended action to the device.

A further aspect relates to a computer program product comprising a computer-readable medium. The computer-readable medium includes a first set of codes for causing a computer to receive from a device a recommended action to be performed based on an unauthorized change implemented on the device. The unauthorized change is a hardware change, a circuitry change, or combinations thereof. The computer-readable medium also includes a second set of codes for causing the computer to evaluate the unauthorized change and the recommended action as a function of implementation policy and a third set of codes for causing the computer to send approval or rejection of the recommended action, wherein the rejection includes an alternative action.

Still another aspect relates to at least one processor configured to diagnose unauthorized changes on a mobile device. The processor includes a first module for receiving notification that an unauthorized change has been made to a mobile device, the notification includes a recommended action and a second module for evaluating the unauthorized change and the recommended action as a function of implementation policy. The processor also includes a third module for communicating an approval or rejection of the recommended action to the device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
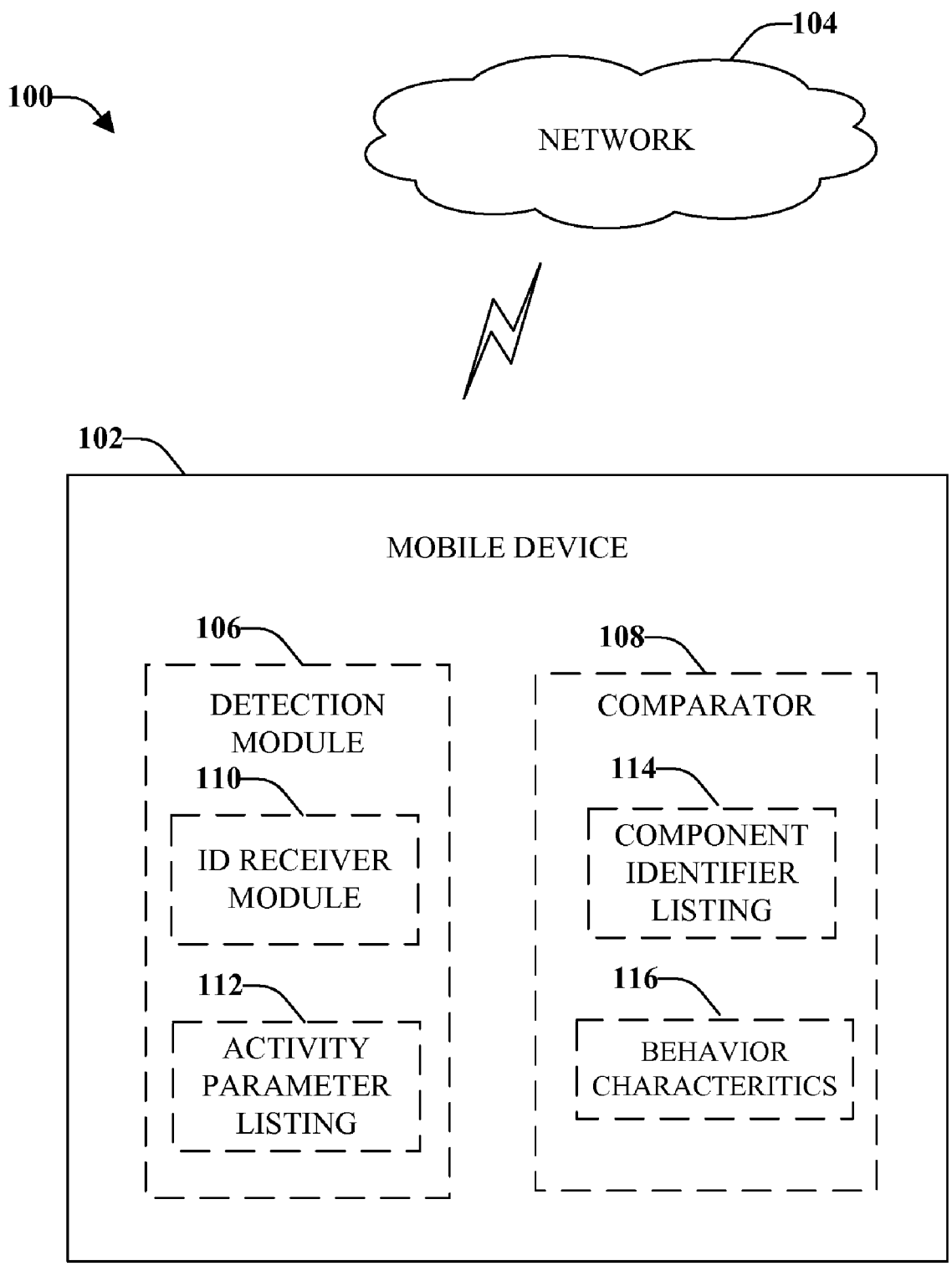
FIG. 1 illustrates a system that can detect and diagnose unauthorized hardware changes.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, Node B, or some other network entity.

Various aspects or features will be presented in terms of systems that may include a number of devices, modules, and the like. It is to be understood and appreciated that the various systems may include additional devices, components, modules, etc. and/or may not include all of the devices, modules etc. discussed in connection with the figures. A combination of these approaches may also be used.

Referring now to FIG. 1, illustrated is a system 100 that can detect and diagnose unauthorized hardware changes. Various changes can be made to a mobile device that result in safety issues or that result in circumventing restrictions placed on the mobile device by a service provider, device manufacturer, and so forth. For example, a mobile device with a limited amount of memory capabilities (e.g., 4 megabytes) might be purchased at a lower cost than a device with higher memory capabilities (e.g., 8 megabytes). If the user attempts to increase the memory capabilities, it can result in damage to the service provider or device manufacturer since the user has circumvented the restrictions (e.g., less memory capability for a lower cost) associated with the purchased device. In another example, a user might change a battery and, intentionally or unintentionally, use a battery with increased voltage, which can result in a safety issue (e.g., device can overheat, battery can explode). System 100 can detect these and other changes that can result in damage to the device user, the device, the device provider, and/or the service provider.

System 100 includes a mobile device 102 that is configured to communicate over a network 104 with other devices, a service provider, and so forth, and to perform various functions related to the communication and/or data exchange.

Included in mobile device 102 is a detection module 106 that can monitor changes to the mobile device 102. The changes can be changes to hardware, circuitry, or other aspects of mobile device 102. A comparator 108 can be configured to evaluate an identification of the new hardware, behavior characteristics of the device, and/or other modifications, or combinations thereof to determine whether the detected change is an authorized change or an unauthorized change.

In further detail, detection module 106 can determine that a change was made based on an identification associated with a new hardware component (e.g., information received directly from the hardware component). When a new hardware component is installed on device 102 information associated with that hardware can be gathered (e.g., received, requested) by an identification (ID) receiver module 110. For example, when a new battery is installed on mobile device 102, the new battery can send its identification (e.g., model number, manufacturer, voltage, and so on) to ID receiver module 110. Based on the identification information, detection module 106 can ascertain if the new hardware is different hardware (e.g., different voltage, different manufacturer) or a direct replacement for old hardware (e.g., the same model number as the previous battery). If the new battery has a different model number, it might indicate an unauthorized hardware change.

In accordance with some aspects, the determination that a change was made can be based on observed activities associated with the mobile device 102 (e.g., processor is overclocking or running too fast). Parameters associated with expected activities can be maintained in an activity parameter listing 112, which can be retained locally on mobile device and/or can be obtained over the network 104. The activity parameter listing 112 can be dynamically updated based on a request for an update and/or based on scheduled updates that are automatically sent to the device 102 or based on other considerations (e.g., software update to device that changes activities of the device).

If a change is detected based on evaluation of the component identifier and/or activity detection, comparator 108 can evaluate the change to determine whether the change is an authorized change or an unauthorized change. Comparator 108 can include a listing of component identifiers 114, which can include OEM component identifiers and/or identifiers of suitable replacement components (e.g., after market components, OEM supported hardware, a suitable replacement, and so forth). The information gathered by ID receiver module 110 (e.g., hardware ID) can be compared against information in the component identifier listing 114. If the information (e.g., hardware ID) matches the listing of approved component identifiers, it indicates that the change is authorized. If the information does not match the listing of approved component identifiers, it indicates that the change is unauthorized and/or that more information is needed to make a determination (e.g., component identifier listing should be updated, further information from the user is needed, and so forth).

The component identifier listing 114 can be updateable, wherein information is pushed to the device 102 from the network 104 and/or pulled from the network 104. For example, at specified intervals (e.g., daily, weekly, monthly, when a listing associated with device 102 is updated) the information can be automatically sent to the mobile device 102. Further, mobile device 102 can request an updated listing based on various criteria (e.g., a new list has not been received lately, a new hardware device is detected that is not included in the listing maintained by device 102, and so forth).

The component identifier listing 114 can include identification of only components that are compatible and/or approved for use with mobile device 102. However, in accordance with some aspects, components that are not approved and/or are not compatible with mobile device 102 can be identified in the component identifier listing 114 as unapproved components. Utilization of a listing 114 that includes unapproved components can result in quicker detection of unapproved components, especially in situations where a critical failure or safety issue might result from use of the unapproved component.

In accordance with some aspects, the component identifier listing 114 is not retained at mobile device 102 but is accessible over the network 104, which can conserve resources (e.g., storage space) on mobile device 102. If the component identifier listing 114 is not maintained on mobile device 102, when comparator 108 needs to determine whether the component is authorized, a message is sent to an application in the network 104. This message can include the component identifier and a request for information relating to the identifier and/or information related to whether the component is approved for use with the mobile device 102 (e.g., based on mobile device model number, based on services purchased for the mobile device, and so forth). In response to the request, an indication can be received specifying whether the component is authorized or unauthorized.

In accordance with some aspects, comparator 108 evaluates the behavior of the new hardware and/or circuitry changes to ascertain if the behaviors substantially conform to expected and authorized behaviors. The behavior is referred to herein as behavior characteristics and relates to the fact that a hardware component should behave in a particular manner. Comparator 108 can include behavior characteristics 116 related to various behaviors that mobile device 102 should exhibit. The behavior characteristics 114 can be dynamically updated, such as over the air. For example, a user might purchase applications and/or updated hardware for use with the mobile device 102. At substantially the same time as the product (e.g., application, hardware) is purchased, information associated with the mobile device 102 can be updated and sent to the device 102 over the network 104. In such a manner, comparator 108 can expect a change to the device, which can be substantially different from the device parameters (e.g., behavior characteristics) as originally purchased (e.g., extended memory purchased although generally this model of device does not have an extended memory, and so forth). For example, a behavior characteristic of a Read Only Memory (ROM) can be that the device should respond with information within a certain interval or range of time (e.g., milliseconds). If the ROM responds too quickly, it can indicate that the behaviors of the ROM were modified, a factory installed ROM replaced, and so forth (e.g., a malfunctioning component).

According to some aspects, the identification and the behavior characteristics are monitored and utilized independently and, if there is a change to either or both, it can indicate unauthorized device 102 changes. In accordance with some aspects, both the identification and the behavior characteristics are utilized together to determine if unauthorized changes have been made to the device. For example, a new battery may be available, which is an approved battery, however, the information that comparator 108 utilizes to determine if the battery is acceptable has not been updated to reflect the new battery information (e.g., new model number). In this situation, comparator 108 can ascertain that the battery identification is not the identification of an approved battery. However, comparator 108 also reviews the battery behavior characteristics and determines that the battery operates as expected/approved. In this situation, comparator 108 can determine that the battery is acceptable. According to some aspects, comparator 108 can dynamically request information over the network 104 relating to the new hardware component (e.g., battery). A reply can be received, in response to the information request, either approving the change or rejecting the change. The response information can be retained, such as in component identifier listing 114.

In accordance with some aspects, a time interval between when a potential unauthorized change and confirmation of whether the change is authorized or unauthorized can be provided. For example, a battery is replaced and the battery ID gathered by ID receiver module 110 is not found (e.g., potentially an unauthorized battery). However, there is a connectivity issue (e.g., the device is in an area with limited or no wireless coverage) and device 102 cannot communicate with the network 104. In this situation, the user is presented with information related to the potential unauthorized change (e.g., "The recently installed battery needs to be confirmed for compatibility with this device.") and the user is given an amount of time to connect to the network 104 and confirm compatibility (e.g., "Please resolve connection problem within 5 hours to confirm compatibility. If compatibility is not confirmed, this device will only be available for emergency communications after 5 hours.") In such a manner, there user is aware that there might be a problem with the device and is provided the opportunity to resolve connectivity issues in order to resolve the problem.

There can be different levels of severity associated with the various unauthorized changes that can be made to the device 102. The action that is taken (e.g., limiting functionality of the device, restricting usage of the device, and so forth) can be a function of the severity level, and can be expressed as policies or rules. In accordance with some aspects, the policies or rules can be remotely configurable such that the policies or rules can be dynamically updated. The policies or rules can indicate categories, such as policies that protect a business model (e.g., increasing memory), policies that relate to user safety, and/or policies that protect data on the phone from theft, and so forth.

Various actions can be performed as a function of detecting an unauthorized change. According to some aspects, the actions can be performed based on an implementation policy that associates an action with an unauthorized change. In accordance with some aspects, the implementation policy is dynamically updateable over the air and/or can be manually overridden (e.g., when an authorized third party or service provider has physical access to the device).

Examples of actions that can be performed include limiting usage of the device to emergency usage, suspending a subset of applications running on the device, restricting at least one device action, and/or suspending device applications associated with the unauthorized change. Another action that can be performed includes logging and reporting information associated with the unauthorized change to a service provider, a user, or both the service provider and the user. In accordance with some aspects, the action can include prompting a user to solve a connectivity problem during a specified amount of time and/or prompting the user for information associated with the unauthorized change.

The various actions that can be performed can be classified into a number of categories. For example, a category can include gathering information related to the unauthorized change and/or reporting information related to the change to the user and/or a service provider. The gathering and/or reporting can occur without interrupting device activity (e.g., the user can continue to utilize the device).

Another category can relate to requesting information from the user related to the detected unauthorized change. For example, after detecting an unauthorized change, a prompt can be sent to the user for further information related to the change (e.g., a request for the user to enter an authorization code in a user interface associated with the device). A further category can relate to requesting information from a service provider in order to obtain authorization of the change. For example, a request can be sent to the service provider (or an authorized third party) to confirm whether the change is acceptable. Further information related to various actions that can be taken will be provided below.

Figure 2:
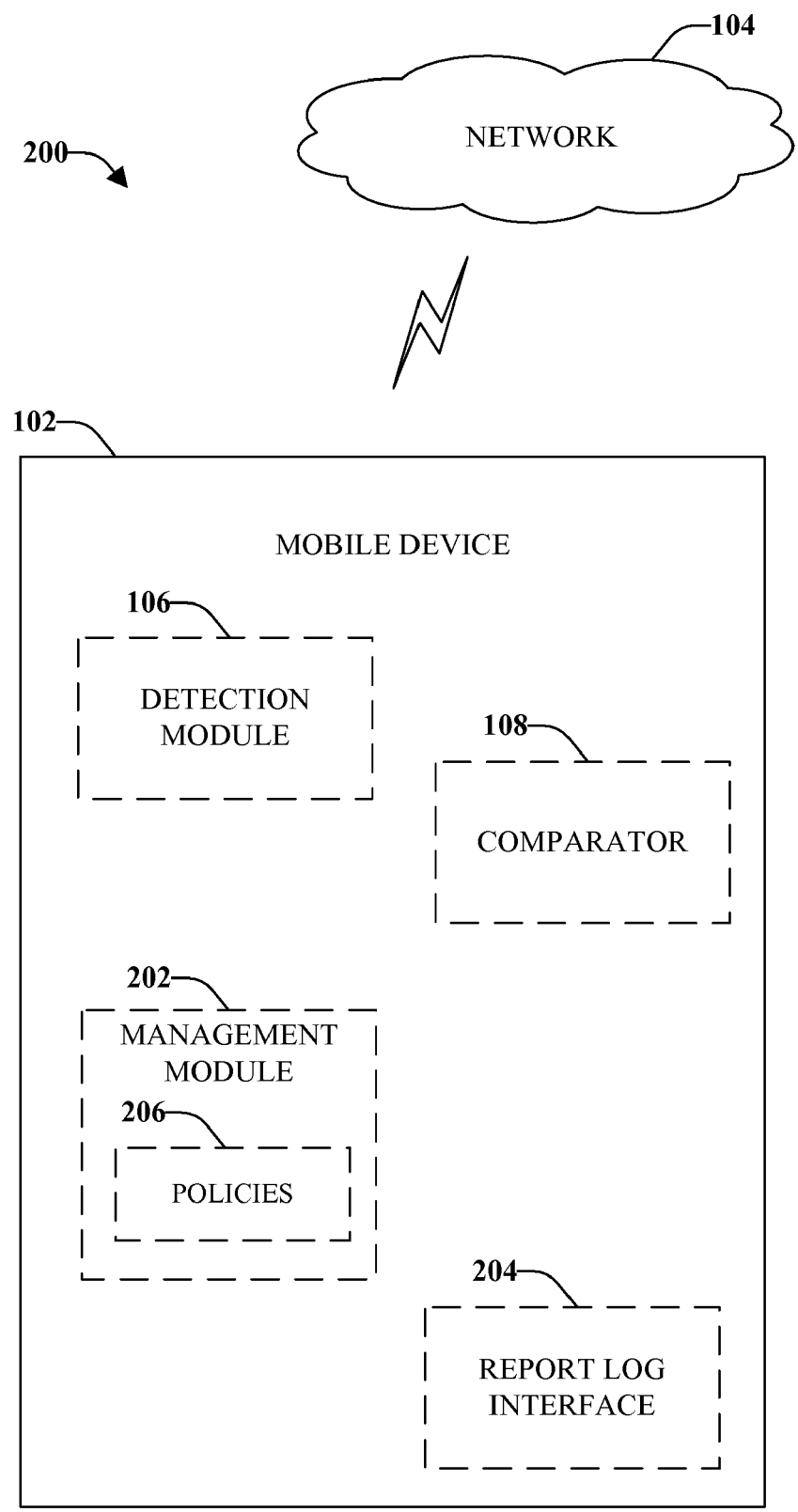
FIG. 2 illustrates a system that can control one or more device parameters based on unauthorized hardware changes.

FIG. 2 illustrates another system 200 that can control one or more device parameters based on unauthorized hardware changes. Similar to the above figure, system 200 includes a mobile device 102 that includes a detection module 106 that monitors changes made to mobile device 102 and a comparator 108 that evaluates parameters associated with the changes to determine if the changes are authorized or unauthorized changes.

Also included in mobile device 102 is a management module 202 that is configured to selectively manage operation of the device 102 if an unapproved hardware and/or circuitry modification has been detected. Management of the device 102 can include powering down the device 102 if a critical situation has developed that relates to safety of the device user (e.g., critical type of change). In this situation, a limited amount of time might be available to notify the user of the unsafe condition and allow the user to use the device for a limited amount of time (e.g., to make an urgent phone call). In another example, it might be determined that the device 102 is overheating and, therefore, the device is powered down immediately to mitigate damage to the user and/or device 102.

In accordance with some aspects, if safety issues are not a factor and no other critical issues exist (e.g., low impact type of change, changes that affect a business model, and so forth), management module 202 can selectively control the operation of the changed hardware and/or circuitry. For example, if a display has been changed with a display having a higher resolution (which is determined to be unauthorized for this device 102), management module 202 can limit the display resolution to the amount of resolution that is authorized. In another example, if the processor is over-clocking, instead of changing the clock speed, management module 202 can modify one or more parameters so that the operating system (OS) is operating in a low priority mode. Operation in the low priority mode can cause the processing of data to take a little longer, however, there are less CPU cycles utilized to process the data. Thus, even through the processor is over-clocking, the CPU is not operating at full speed (e.g., high priority mode), which can be dangerous and cause safety issues.

Additionally or alternatively, a report log interface 204 can be included on mobile device 202. Report log interface 204 can be configured to gather information related to detected changes, both authorized and unauthorized, and report the information to a service provider, over the network 104. Further, report log interface 204 can provide information as to what action is to be performed by management module 202 and why that action will be performed.

For example, before powering down the device 104, report log interface 204 sends a message to a user and/or a user manager (e.g., service provider) reporting the current situation and the action that will be performed (e.g., device will be powered down). The user can be prompted to obtain connectivity if there is a communication problem. For example, if there is a connectivity issue, confirmation of whether a change is authorized or unauthorized might not be available. Further, confirmation of actions that should be taken or policies associated with the detected change might not be accessible from the network 104. The user might also be prompted for information relating to the change (e.g., license key and so forth). The user can be given a period of time during which to provide the information or to resolve a connectivity problem.

Based on the reported information, the service provider has information relating to the action and the reason for the action and can respond to the information. For example, if the device is powered down (e.g., turned off), the user might contact the service provider to report that the device is not working. The service provider can review the information received from report log interface 204 and advise the customer the reason why there is no service (e.g., incorrect size battery is creating a safety issue).

It should be understood that powering down the device 102 is just one type of action that can be performed by management component 202 based on the unauthorized change. Other actions, can be performed, such as impeding certain behaviors or device actions, limiting certain actions, and so forth. In accordance with some aspects, when an unauthorized change is detected, the device 102 is placed into a mode wherein all functionality is disabled expect the functionality that allows report log interface 204 to report information to a service provider and/or other functionality associated with detecting unauthorized changes (e.g., other applications are suspended). If the service provider authorizes the change made by the user, the service provider can enable the device over the air through the subset of enabled functionality. For example, if memory is upgraded, the user can be prompted for information related to the upgrade (e.g., credit card number for payment associated with the upgrade). At substantially the same time as the information is received and the change is authorized, full access can once again be provided (e.g., applications temporarily suspended are activated).

In accordance with some aspects, before at least a subset of actions are performed that restrict or limit device usage (e.g., after providing an amount of time for connectivity issues to be resolved, after prompting user for authentication information, such as a license, payment verification, and so forth), a report is sent to the service provider. At substantially the same time as the report is sent, a confirmation is sent asking if the recommended action should be carried out by management module 202. Management module 202 can be associated with (or have access to) policies 206 that provide management module 202 with information (e.g., policies, rules) about how to proceed based on the circumstances (e.g., a case-by-case analysis) related to the unauthorized change. The policies 206 can be dynamically updated over the air. The policies 206 can relate to various categories such as a business model, user safety, theft protection, and so forth.

In accordance with some aspects, the unauthorized changes can be classified as more detrimental or serious than other an unauthorized changes that can have a lower impact (e.g., critical type, low impact type, business model, user protection, theft protection, and so forth). The classification of the unauthorized changes can be specified by the policy 206. For example, some changes (e.g., related to a business model policy) might require permission before the management module 302 carries out the action (e.g., restricting device usage) while other changes (e.g., illegal downloading of games, movies, and so forth) can result in actions that are automatically implemented by management module 302. A trigger for requesting approval can be anytime the management component 202 is about to take some action based on something it detects happening on the device that is outside of a threshold (e.g., authorized) or where there is information that does not match approved information (e.g., component identification does not match approved listing, behavior characteristics are not expected, and so forth). In accordance with some aspects, the policy can be dynamically updated over the air.

For example, before powering down the device, a policy or rule might indicate that verification (or approval) is needed before performing the action. Thus, a report and request can be sent by report log interface 204. If a response is received indicating that the recommended action (e.g., turning off the device) is acceptable, management component 202 can proceed. If the response is that the recommended action is not acceptable, management component 202 does not proceed and, in accordance with some aspects, an alternative action can be implemented by service component and carried out by management component 202.

In accordance with some aspects, confirmation is not requested before a particular action (e.g., limiting a subset of device functionality) is implemented. For example, if a user is illegally downloading games, the policies 206 can indicate that all game usage is restricted or usage of a 3D module is restricted (e.g., the 3D module is utilized to play the illegally downloaded games). In this situation, confirmation might not be requested before some functionality of the device is limited or restricted.

According to some aspects, the user is prompted for information related to the change. Some actions that might be implemented can have a negative effect, such as turning off the device. In this situation, either or both the user and the service provider can receive the report and the recommended action before that action is implemented. In accordance with this aspect, the user can be provided the opportunity to prove that the change is authorized. For example, the user can be notified that a higher resolution display has been detected and, in order to retain the usage of the higher resolution, the user needs to prove that the display was purchased. The user can be prompted for a license key or another manner of providing that it was an authorized purchase.

Additionally or alternatively, machine learning and reasoning can be employed to automatically infer and implement actions. For example, machine learning and reasoning can be employed to evaluate behavior characteristics and/or user activity on the device in order to determine what is typical behavior of the user and/or the device and to infer changes to that behavior over time. Machine learning and reasoning can also be employed to implement one or more actions based on observed changes. The one or more actions can include, but are not limited to, prompting a user to resolve connectivity problems, prompting a user to provide information (e.g., license key) related to a particular change, limiting usage of the device, suspending all but a subset of device applications, and so forth.

Figure 3:
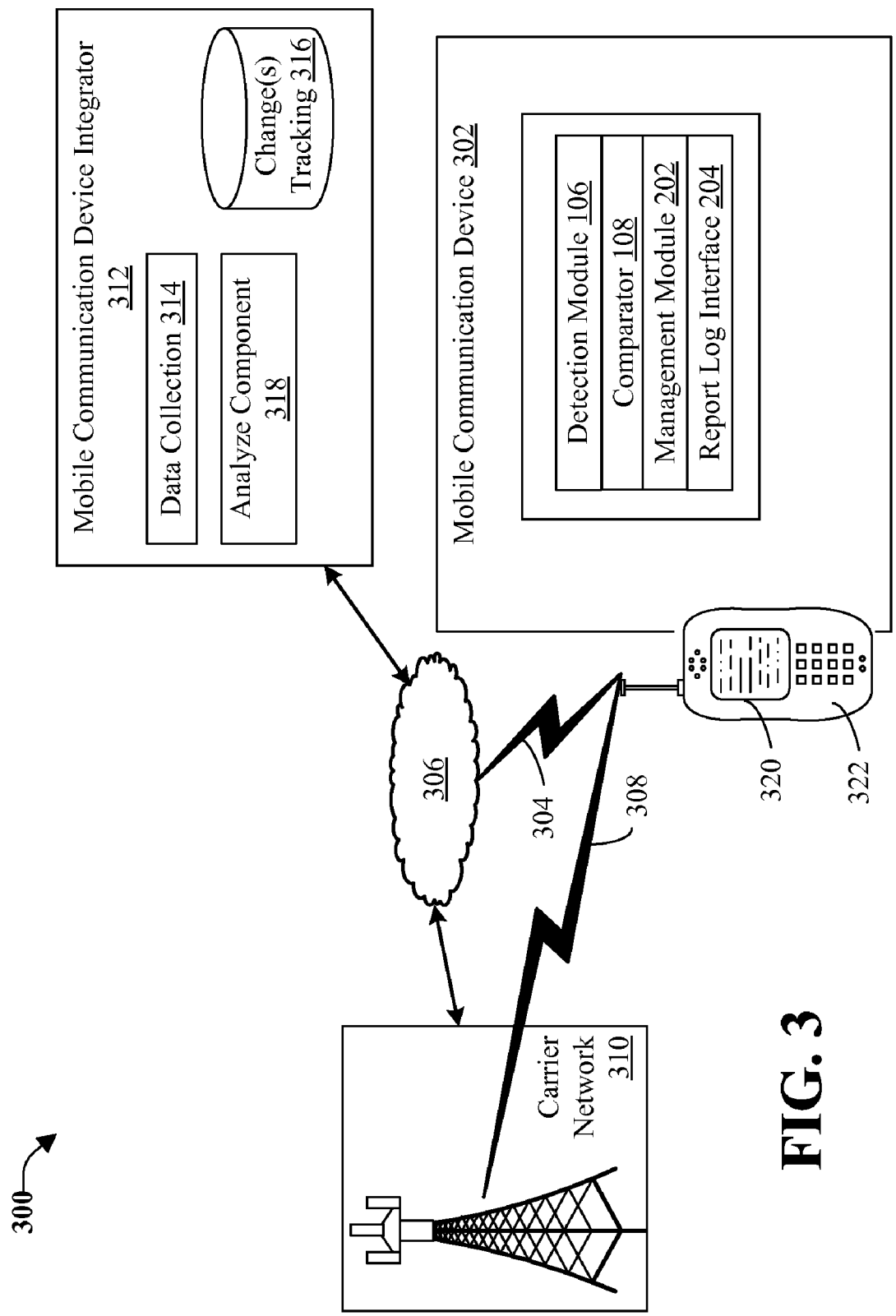
FIG. 3 illustrates a communication system that includes a wireless device, depicted as mobile communication device.

FIG. 3 illustrates a communication system 300 that includes a wireless device, depicted as mobile communication device 302. Although only one mobile communication device 302 is illustrated, there can be multiple mobile communication devices within communication system 300. However, only one device is illustrated and described for simplicity purposes. Mobile communication device 302 communicates with network, illustrated as a wireless data packet communication channel depicted at 304 with a data network 306 and/or cellular communication channel depicted at 308 with a carrier network 310.

At least one mobile communication device 302 includes a detection module 106 that monitors the communication device 302 to determine if a change has been made to one or more hardware components, a circuit, or other device 302 parameters. A comparator 108 is configured to determine whether the detected change is an authorized change or an unauthorized changed. The determination can be made based on a hardware identification, a behavior characteristic, or combinations thereof.

Further communication device 302 can include a management module 202 that can recommend an action based on an unauthorized changed to the communication device 302. A report log interface 204 can communicate the change (e.g., both authorized and unauthorized) to a service provider and/or the user. Additionally, report log interface 204 can provide information relating to the recommended action and request approval of the action. Management module 202 can automatically implement the action and/or can wait for approval of the action before proceeding. In accordance with some aspects, the determination of what action to recommend and/or whether to automatically proceed or wait for approval can be made based on one or more policies.

A mobile communication device integrator 312 can be configured to monitor authorized changes and/or unauthorized changes to mobile communication device 302. Mobile communication device integrator 312 can be configured to receive notification that an unauthorized change has been made to mobile device 302. The unauthorized change is a hardware change, a circuitry change, or combinations thereof. The notification includes a recommended action. Mobile communication device integrator 312 can evaluate the unauthorized change and the recommended action as a function of implementation policy and communicate an approval or rejection of the recommended action to the mobile device. In accordance with some aspects, mobile communication device integrator 312 transmits the implementation policy to the mobile device when there is a change to the implementation policy, when a request for the implementation policy is received from the mobile device, or combinations thereof. If the recommended action is rejected, the communication can include an alternative action to be implemented. According to various aspects the recommended action or the alternative action comprises one or more of limiting usage of the device to emergency usage, suspending a subset of applications running on the mobile device, restricting at least one mobile device action, and/or suspending device applications associated with the unauthorized change.

Mobile communication device integrator 312 can be associated with network 310 or can be managed by a third party. For example, if the device 302 is utilized to connect to the Internet, monitoring can indicate whether a laptop computer is connected to the Internet, though device 302, based on a traffic activity that is above a threshold level or traffic that is not related to the device 302. If unauthorized activity is detected (e.g., connecting a laptop to the Internet), the carrier, or a third party can disable or limit the amount of traffic allowed (e.g., only a certain number of megabytes) each month. Thus, report log interface 204 can monitor the activity, which enables a third party to make adjusted on their end (e.g., limiting the amount of Internet traffic) based on the provided information.

The changes can be retained by data collection processes 314 stored in a change tracking database 316. The information relating to the tracked changes can provide information (e.g., gathered anonymously) for device manufactures and/or service providers to meet consumer needs and desires. For example, based on the retained changes, determinations can be made based on further device parameters (e.g., should devices be provided with more memory, faster CPU processing capabilities, and so forth).

Further, mobile communication device integrator 312 can include an analyze component 318 that selectively approves or denies an action recommended by a management component 202. If the action is not approved, an alternative action can be supplied and carried out by management component 202.

In accordance with some aspects, information related to whether the change is authorized or unauthorized can be presented to the user though a display 320 or through another means (e.g., speaker, LCD, LED, lights blinking in a certain sequence, and so forth). For example, if the change is authorized, the user can be presented with information that the change is accepted. If the change is unauthorized, the user can be presented with information that the change will not be applied, the mobile communication device 302 will be turned off, or other actions that will be made. The user can be provided with an opportunity to provide information relating to the change (e.g., one hour, five hours, ten hours, one day, a week, and so forth). The user can confirm the change through interaction with a key board 322 or another user interface means.

Additionally or alternatively, approval of the unauthorized change can be performed manually by an authorized third party (e.g., authorized retailer) and/or a service provider. For example, a user purchases a device and/or brings the device to a retailer (e.g., store). While the retailer has physical possession of the device, the authorized retailer can override or disable one or more of the functionalities associated with detection of unauthorized changes. For example, a functionality that can be disabled can be functionality associated with checking for a certain type of hardware change (e.g., battery) and/or functionality associated with overriding an action associated with an unauthorized change (e.g., never prompt the user for information).

A number of different techniques can be utilized by the authorized third party to override and/or disable functionality associated with detection of unauthorized changes. For example, a salesperson (associated with the authorized retailer) can enter a code manually into a user interface. Alternatively, the sales person can have a hardware dongle (e.g., USB dongle key) that performs a security exchange with a certificate retained in the device in order to validate the manual alteration of an implementation policy (e.g., disable, override, and so forth).

Figure 4:
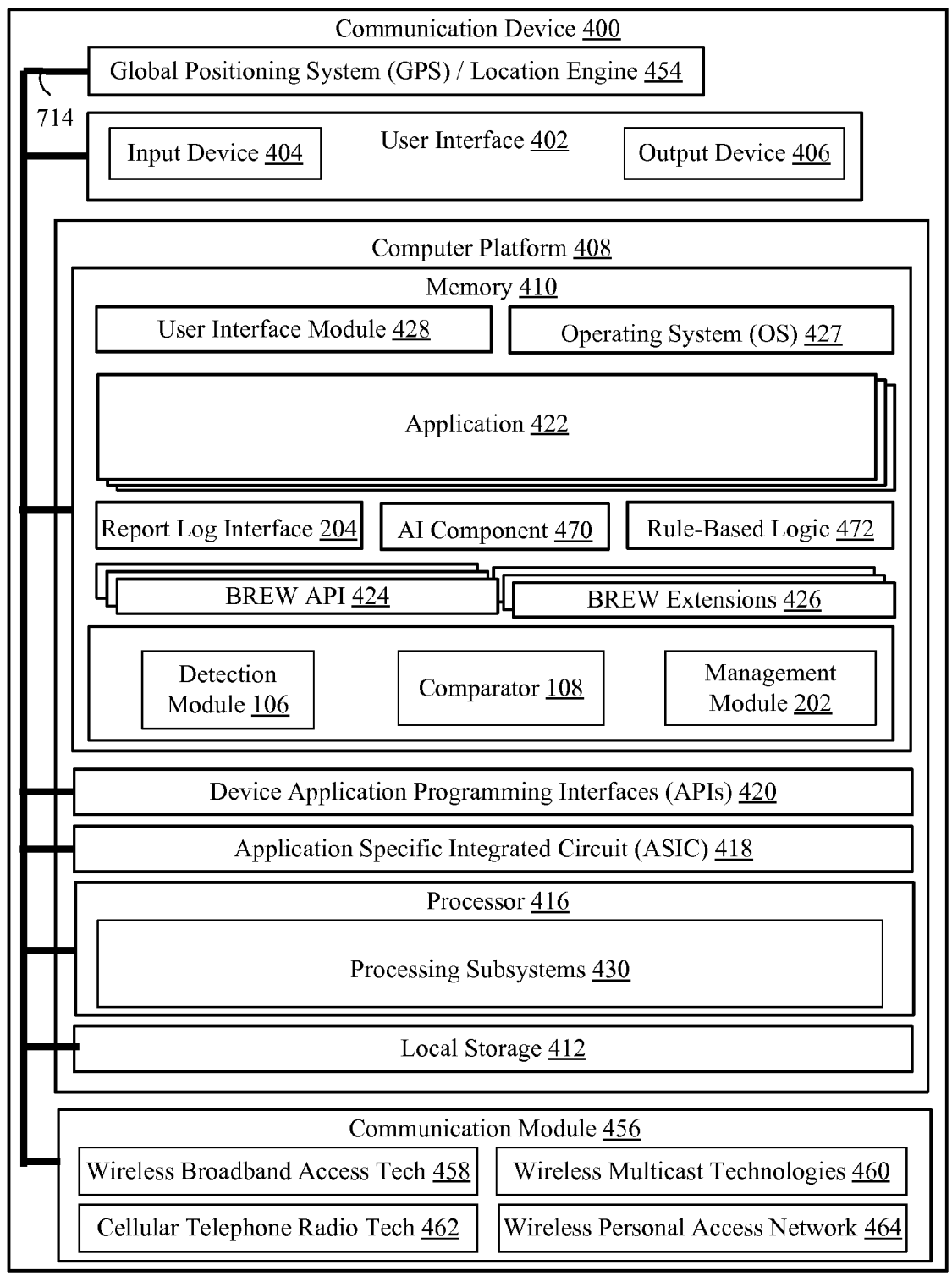
FIG. 4 illustrates an exemplary version of a communication system according to some aspects as any type of computerized device.

FIG. 4 illustrates an exemplary version of a communication system 400 according to some aspects as any type of computerized device. For example, the communication device 400 can comprise a mobile wireless and/or cellular telephone. Alternatively, the communication device 400 can comprise a fixed communication device, such as a Proxy Call/Session Control Function (P-CSCF) server, a network device, a server, a computer workstation, and so forth. It should be understood that communication device 400 is not limited to the described or illustrated devices, but can further include a Personal Digital Assistant (PDA), a two-way text pager, a portable computer having a wired or wireless communication portal, and any type of computer platform having a wired and/or wireless communications portal. Further, the communication device 400 can be a remote-slave or other similar device, such as remote sensors, remote servers, diagnostic tools, data relays, and the like, which does not have an end-user thereof, but which simply communicates data across a wireless or wired network. In alternate aspects, the communication device 400 can be a wired communication device, such as a landline telephone, personal computer, set-top box or the like. Additionally, it should be noted that any combination of any number of communication devices 400 of a single type or a multitude of the previously discussed types can be utilized in a cellular communication system (not shown). Therefore, the one or more disclosed aspects can accordingly be performed on any form of wired or wireless device or computer module, including a wired or wireless communication portal, including without limitation, wireless modems, Personal Computer Memory Card International Association (PCMCIA) cards, access terminals, personal computers, telephones, or any combination or sub-combination thereof.

Additionally, the communication device 400 may include a user interface 402 for purposes such as viewing and interacting with information related to user-implemented device changes. This user interface 402 includes an input device 404 operable to generate or receive a user input into the communication device 400, and an output device 406 operable to generate and/or present information for consumption by the user of the communication device 400. For example, input device 402 can include at least one device such as a keypad and/or keyboard, a mouse, a touch-screen display, a microphone in association with a voice recognition module, and so forth. Further, for example, output device 406 can include a display, an audio speaker, a haptic feedback mechanism, an LCD, one or more LEDs, and the like. Output device 406 can generate a graphical user interface, a sound, a feeling such as a vibration or a Braille text producing surface, an illumination (e.g., light), and so forth.

Further, communication device 400 can include a computer platform 408 operable to execute applications to provide functionality to the device 400, and which may further interact with input device 404 and output device 406. Computer platform 408 can include a memory, which can comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory can include active memory and storage memory, including an electronic file system and any secondary and/or tertiary storage device, such as magnetic media, optical media, tape, soft and/or hard disk, and removable memory components. In the illustrative version, memory is depicted as RAM memory 410 and a nonvolatile local storage component 412, both connected to a data bus 414 of the computer platform 408.

Further, computer platform 408 can also include a processor 416, which can be an application-specific integrated circuit (ASIC), or other chipset, processor, logic circuit, or other data processing device. Certain of these capabilities of the communication device 400 can be facilitated by code loaded from local storage 412, retained in memory 410, and executed by the processor 416. In some aspects, such as when communication device 400 comprises a cellular telephone, processor or other logic such as an application specific integration circuit (ASIC) 418 can execute an application programming interface (API) 420 that interfaces with any resident software components, depicted as applications (e.g., games) 422 that can be active in memory 410 for other functions (e.g., communication call control, alarm clock, text messaging, and so forth). Device APIs 420 can be a runtime environment executing on the respective communication device. One such API 420 runtime environment is BREW API 424. The Binary Runtime Environment for Wireless® (BREW®) software, developed by Qualcomm, Inc. of San Diego, Calif., exists over the operating system 427 of a computing device, such as a wireless cellular phone. BREW® software can provide a set of interfaces to particular hardware features found on computing devices. The BREW APIs 424 provide the ability for applications to call Device APIs 420 and other functions without having to be written specifically for the type of communication device 400. Thus, applications 422, if composed in BREW, or other software components on the communication device 400 can operate identically, or with slight modifications, on a number of different types of hardware configurations within the operating environment provided by BREW API 424, which abstracts certain hardware aspects. A BREW extension 426 adds additional capability to the programming platform of the BREW API 424, such as offering MP3 players, Java Virtual Machines, and so on.

As an example, a User Interface module 428 can be a brew extension 426, leveraging a uiOne delivery system (UDS) as part of a network. The uiOne™ architecture also developed by Qualcomm, Inc. as part of BREW provides a set of BREW extensions 426 that enable rapid development of rich and customizable User Interfaces (UIs) (active content, over-the-air (OTA) up-gradable), helps to evolve download business beyond applications, provides theming of part or entire handset UI, and utilizes BREW UI Widgets. Thus, BREW uiOne reduces the time to market for handsets, carrier customization, and consumer personalization. To do this, the BREW uiOne provides a clear set of abstractions, adding two new layers to the application development stack for BREW. The uiOne delivery system is used to update communication device UIs over-the-air. This delivery system can be deployed in a standalone fashion, allowing operators to leverage the functionality of their own delivery system. Additional benefits can be realized by deploying uiOne architecture with uiOne delivery system, especially when deployed in conjunction with other elements of the BREW solution (e.g., monetization and billing of downloadable UI packages when the operator does not already have the appropriate infrastructure).

Additionally, processor 416 can include various processing subsystems 430 embodied in hardware, firmware, software, and combinations thereof, that enable the functionality of communication device 400 and the operability of the communication device 400 on communications system. For example, processing subsystems 430 allows for initiating and maintaining communications, and exchanging data, with other networked devices as well as within and/or among components of communication device 400. In one aspect, such as in a cellular telephone, processor 416 can include one or a combination of processing subsystems 430, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, and so on. For the disclosed aspects, processing subsystems 430 of processor 410 can include any subsystem components that interact with applications executing on computer platform 408.

The illustrative depiction of the processing subsystems 430 wherein the communication device 400 is a cellular telephone, processing subsystems 430 can include one or more of a receive ("Rx") component for receiving communications sent to the processor of the wireless device, a call processing ("CP") component and/or system determination ("SD") component for handling the initiation, authentication, handoffs, data exchanges, messaging protocols, internal processing and decision-making, etc. associated with processing a message, and a transmit ("Tx") component for sending communications from the processor of the wireless device, such as to handset components, wireless network, wireless network components, and other devices connected to the wireless network. In accordance with some aspects, CP component can handle the majority of the call processing tasks, while SD component can handle tasks relating to selecting an appropriate system, from a multitude of systems, with which to communicate, as well as higher-level decision-making tasks referenced by CP component. In addition, processing subsystems 430 can further include one or more of a diagnostic ("Dx") component for evaluating a subsystem, a fax ("Fx") component for handling facsimile communications, a call manager ("CM") component for characterizing and logging call types, a messaging component ("M") for text sending and receiving, and a data services ("DS") component for processing all data-related communications, such as establishing and maintaining data calls.

Computer platform 408 can further include a GPS engine 454 or other location sensing components to provide location information of the communication device 700.

A communications module 456 that enables communications among the various components of communication device 400, as well as being operable to communications related to receiving advertisements, including targeted advertisements. Communications module 456 can be embodied in hardware, firmware, software and/or combinations thereof, and may further include all protocols for use in intra-device and inter-device communications. In one aspect, the communication module 456 includes a wireless broadband access technology portion 458, a wireless multicast technology portion 460, a cellular telephone radio technology portion 462, and a wireless personal access network portion 464. Examples of two-way wireless broadband access technology portion 458 can include one or more of a wireless code division multiple access (W-CDMA) component, an Evolution-Data Optimized (EV-DO) component, an IEEE 802.11 compliant (often mischaracterized by the trademark WiFi) component. An example of a wireless personal access network technology portion 464 includes a Bluetooth component. Examples of a wireless multicast technology portion 460 include a Forward Link Only (FLO) component and/or a Digital Video Broadcast-Handheld (DVB-H) component.

Also included in communication device 400 can be a detection module 106 that detects user-initiated changes made to communication device 400. A comparator 108 can compare the change to an approved change (e.g., component identifier, behavior characteristics) and make a determination whether the change is authorized or unauthorized. A management module 202 can recommend an action if the change is unauthorized and selectively apply the action based on one or more policies (e.g., automatically apply the action, request approval before applying the action, and so forth). Also included is a report log interface 204 that gathers and reports the changes and/or the recommended actions to a user, a service provider, a device provider, or other entities for further processing.

In order to determine whether a change is authorized or unauthorized and/or to apply actions based on the change, an artificial intelligence (AI) component 470 and/or a rule-based logic component 472 can infer information relating to the change and/or action. The rules-based logic component 472 can be employed to automate certain functions described or suggested herein. In accordance with this alternate aspect, an implementation scheme (e.g., rule) can be applied to define types of attributes that should be acted upon or ignored, create rules that are aware of authorized changes, performance delays in certain components of the computing platform in order to diagnose various changes, and so forth. By way of example, it will be appreciated that the rule-based implementation can automatically define criteria for when to authorize a change and/or which action to perform based on the result of the change (e.g., critical).

The AI component 470 can facilitate automating performance of one or more features described herein such as learning what is normal and abnormal behavior characteristics of the device, learning specific interactions the user performs with the various applications, which can impact the behavior characteristics. Thus, employing various AI-based schemes can assist in carrying out various aspects thereof.

A classifier is a function that maps an input attribute vector, x=(x1, x2, x3, x4, xn), to a class label class(x). A classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits in an optimal way the triggering input events from the non-triggering events. Other classification approaches, including Naïve Bayes, Bayesian networks, decision trees, neural networks, fuzzy logic models, maximum entropy models, etc., can be employed. Classification as used herein also is inclusive of statistical regression that is utilized to develop models of priority.

As will be readily appreciated from the subject specification, the disclosed aspects can employ classifiers that are pre-trained (e.g., through a generic training data from multiple users) as well as methods of reinforcement learning (e.g., by observing user behavior, observing trends, receiving extrinsic information). Thus, the disclosed aspects can be used to automatically learn and perform a number of functions, including but not limited to determining, according to a predetermined criteria.

The memory can store information related to component identifiers and behavior characteristics and utilizing the component identifiers and behavior characteristics to determine whether a change is authorized or unauthorized. Additionally, the memory can retain instructions relating to reporting log reports that include information relating to the changes and/or recommended actions.

The processor 416 can facilitate analysis of information related to detecting unauthorized changes in a communication network. Processor 416 can be a processor dedicated to analyzing and/or generating information received by communication device 400, a processor that controls one or more components of device 400, or combinations thereof. Memory can store protocols associated with authorized and unauthorized changes, such that device 400 can employ stored protocols and/or algorithms to achieve improved device modifications techniques in a wireless network as described herein.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
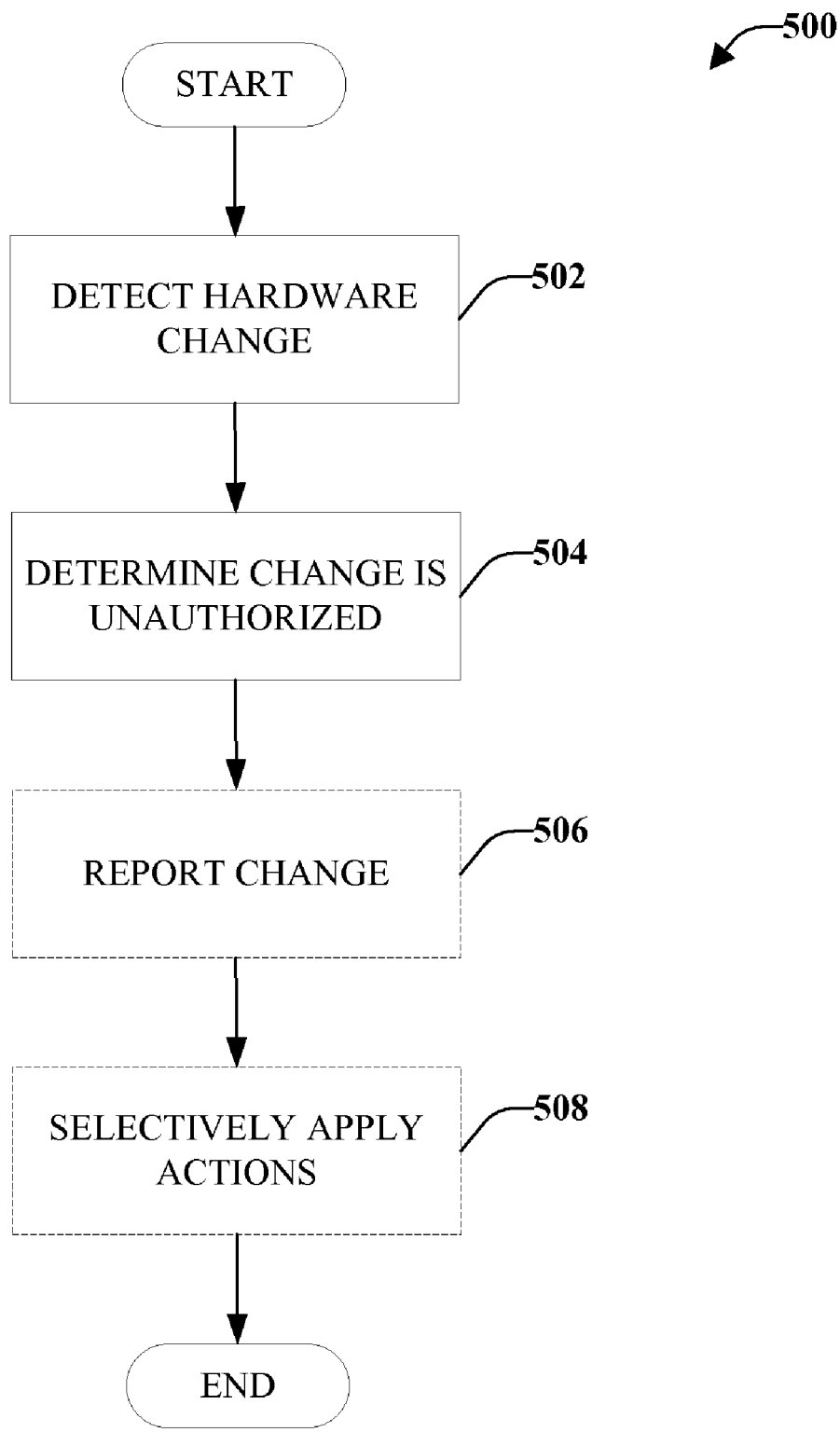
FIG. 5 illustrates a method for diagnosing unauthorized hardware changes to a mobile device.

FIG. 5 illustrates a method 500 for diagnosing unauthorized hardware changes to a mobile device. Method 500 can be configured to detect and diagnose unauthorized changes to protect a user, a device, or to maintain integrity of the services provided to device users. In accordance with some aspects, method 500 powers down the device (if need) to prevent any possible device damage and/or possible injury to a device user. For example, a device user changes to a non-OEM battery or changes a circuit that over-clocks a CPU to obtain more CPU processing. Further, the type of problem that the change can cause is identified to mitigate the chances of injury. Thus, if someone is using a non-authorized or non-valid battery on a device, method 500 is able to detect the unauthorized battery and power down the phone or limit use of the device to only allow the user to make emergency calls. For example, method 500 can suspend at least a subset of device applications based on the detected changes.

At 502, a hardware change made on a mobile device is detected. The change can be based on information that new hardware has been installed on the device (e.g., the new hardware broadcasts its identification information). For example, when a battery is installed in a device various information (e.g., manufacturer, model number, voltage, and so forth) can be broadcast by the battery. In accordance with some aspects, the change can be detected based on observed activities (e.g., processor is over-clocking or running too fast).

A determination is made, at 504, whether the hardware change is an authorized change or an unauthorized change. The determination can be made as a function of a component identification, a behavior characteristic, or combinations thereof. The component identification can be determined based on a dynamically updateable component identification listing. In accordance with some aspects, the component identification listing can be updated over the air automatically and/or upon request for an update. For example, if a mobile device has a new battery release, the component identification listing can be updated with the battery information and the list automatically transmitted to mobile device (or accessible by mobile device).

In accordance with some aspects, information associated with allowable characteristics of a certain piece of hardware can be retained. For example, a battery voltage should not go above 4.0 V and if it is determined that a newly installed battery has a voltage of 4.5V, that battery might not be supported by device (e.g., unauthorized change). In another example for over-clocking, the processing speed is not allowed to go above a certain Mhz (or under a certain MHz). In a similar manner, RAM can be monitored with respect to access time and other variables.

The change, either authorized or unauthorized, can be optionally reported to a service provider, at 506, as indicated by the dashed line. The service provider can utilize the information to perform further actions relating to this device and/or to device improvements.

At 508, in an optional aspect as indicated by the dashed line, an action is recommended based on the type of the unauthorized change, wherein a type can be classified in accordance with a severity level, a business model, user safety, theft prevention, and so forth. For example, a critical type of change is a change that can have drastic consequences (e.g., device overheating, injury to the user). A low impact type of change is a change that does not have associated drastic consequences (e.g., a business model, such as a higher resolution display installed on the device). If the change is a critical type, a recommended action can be to power down the device or disable all applications except emergency calls and applications utilized by method 500. If the change is a low impact type of change, various restrictions can be placed on the device (e.g., limit the amount of display resolution). In accordance with some aspects, the recommended action is implemented based on an implementation policy. The implementation policy can include requesting approval from a service provider prior to performing the recommended action and/or automatically performing the action. For example, if a higher resolution LCD is installed on the device, an action can be to restrict the amount of resolution output. If a larger capacity ROM or RAM chip is installed, the amount of memory that can be utilized can be restricted.

Figure 6:
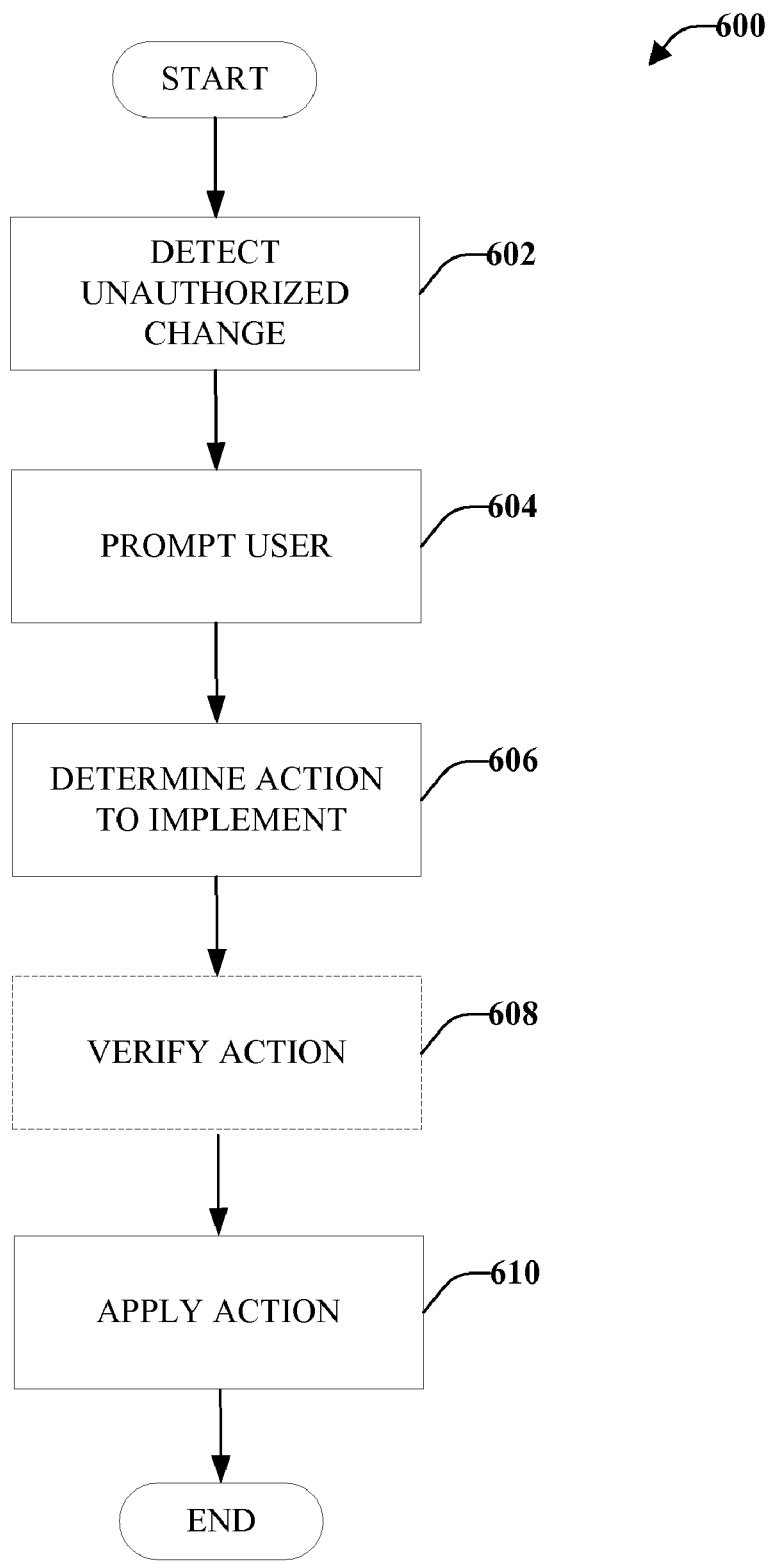
FIG. 6 illustrates a method for detecting unauthorized changes on a mobile device.

FIG. 6 illustrates a method 600 for detecting unauthorized changes on a mobile device. At 602, a potential unauthorized change is detected. The change can be a change to hardware, a circuitry change, or other devices changes. Determining the change is unauthorized can be a function of a component identification, a behavior characteristic, or combinations thereof. The component identification can be determined by a dynamically updatable component identification listing. For example, the component identification listing can be updated over the air based on an update to the listing, a request for a new listing, or based on other criteria.

At 604, a prompt is sent to the user based on the unauthorized change. The prompt can be for the user to solve a connectivity problem during a specified amount of time. For example, when the unauthorized change is detected, there might not be a network connection available (e.g., the user is in a location where there is no (or limited) connectivity. In this situation, the user can be given a limited amount of time in order to resolve the connection problem (e.g., one day, a week, and so on). In accordance with another aspect, the prompt can be for the user to provide information associated with the unauthorized change. The information can include proof that the change is authorized (e.g., a license key, a receipt indicating the change has been purchased, and so forth).

The user response (if any) is received and, at 606, a determination is made as to an action that should be implemented. In accordance with some aspects, the action is determined based on an implementation policy that associates an action with an unauthorized change. The implementation policy can be dynamically updated, such as over the air, and can take into account various criteria including updated hardware components (e.g., new hardware identification), newly discovered compatible hardware devices, and so forth. The policy can include a listing, table, or other means of corresponding a particular unauthorized change with a specific action (e.g., if illegal downloading of games is detected, suspend use of a 3D module).

The action to be implemented can include limiting usage of the device to emergency usage. For example, a mobile device, such as a cellular telephone, can have outgoing phone call limited to only "911" or other emergency calls (e.g., roadside assistance). In such a manner, the device is limited without compromising the safety of the user or others in need of emergency assistance.

Additionally or alternatively, the action to be implemented can include suspending a subset of applications running on the device. For example, applications related to diagnosing unauthorized hardware change can be allowed to continue to function while all other applications (or a subset of the other applications) are suspended until resolution of the unauthorized change (e.g., change is deemed authorized, change is reversed, and so forth).

In accordance with another aspect, the action to be implemented can include restricting at least one device action. For example, a display having a higher resolution than the display purchased by the user is installed on the device, and considered an unauthorized change. The resolution allowed to be output (e.g. presented to the user) can be restricted or limited to the amount of resolution for which the device is authorized (e.g., the amount of resolution purchased).

In accordance with some aspects, the action to be implemented includes suspending device applications associated with the unauthorized change. For example, if the unauthorized change is the detection of illegal downloading of games, video content, or the like, usage of a 3D module can be restricted without affected other device functionality.

In accordance with some aspects, the action to be implemented includes logging and reporting information associated with the unauthorized change to a service provider, a user, or both the service provider and the user. At 608, in an optional aspect as indicated by the dashed line, a request for verification of the action to be implemented is requested. This request can be transmitted to a service provider and can be requested based on policies associated with a particular unauthorized change. In this optional aspect, a reply is received that includes approval of the action or rejection of the action. In accordance with some aspects, if the proposed action is rejected, a alternative action can be provided by the service provider.

At 610, the action is selectively applied. If the user has provided the appropriate credentials related to the detected unauthorized change, rending the change authorized (e.g., user supplied a license key, proof of purchase, and so forth). The action is not applied. If the user solved a connectivity problem within the allotted amount of time and the change has been determined to be authorized, the action is not applied. If the service provider rejected the action, the action is not applied (however, an alternative action supplied by the service provider, if any, is applied). In accordance with some aspects, the action is automatically applied, without verification, based on the implementation policy.

Figure 7:
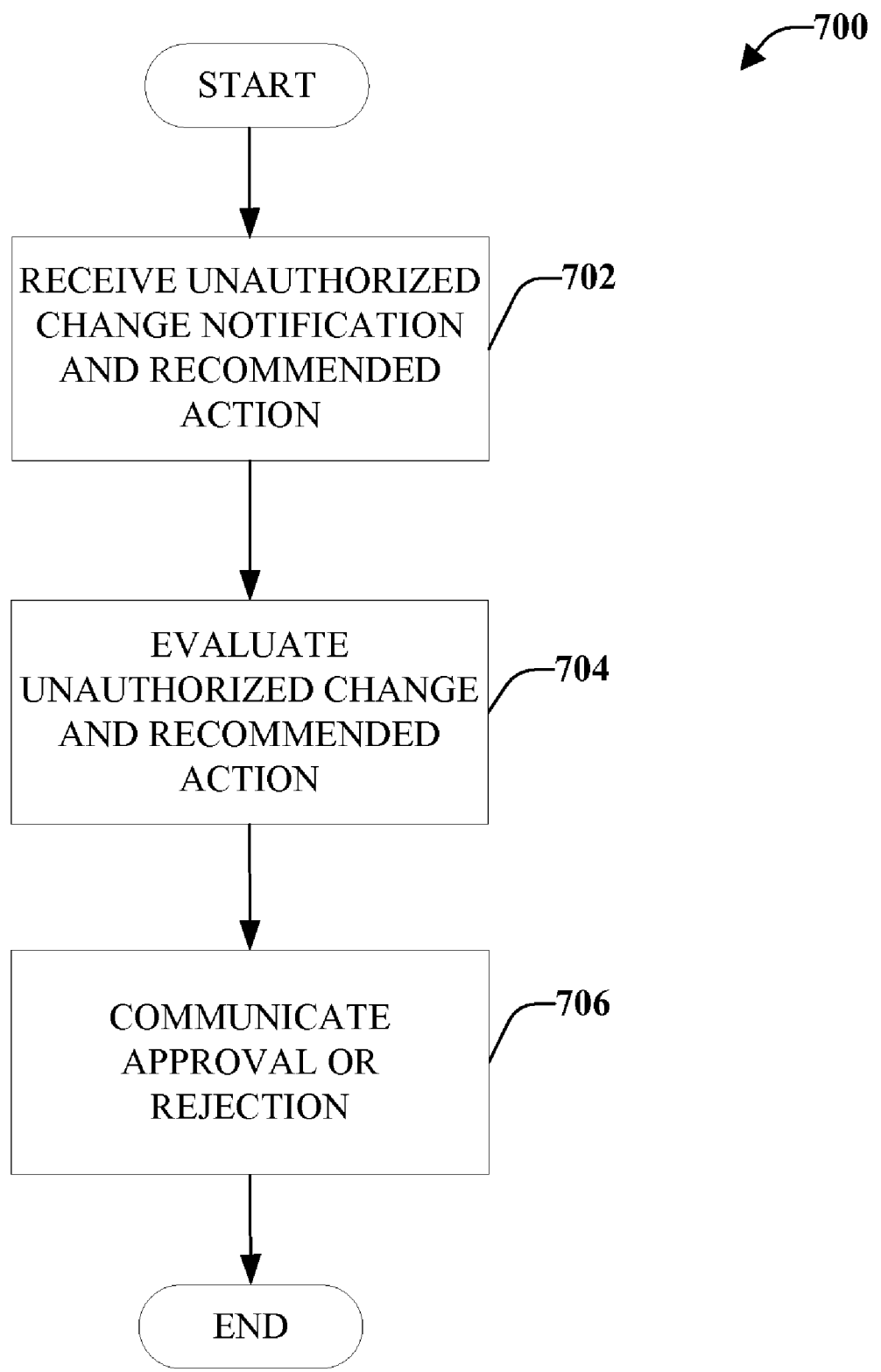
FIG. 7 illustrates a method for remotely diagnosing unauthorized changes on a mobile device.

FIG. 7 illustrates a method 700 for remotely diagnosing unauthorized changes on a mobile device. At 702, a notification that an unauthorized change has been made to a mobile device is received. The unauthorized change can be a hardware change, a circuitry change, or combinations thereof. In accordance with some aspects, the unauthorized change is detection of illegal downloads or illegal activity associated with the device.

The unauthorized change and recommended action are evaluated, at 704. The evaluation can be a function of an implementation policy. The implementation policy can cross-reference an unauthorized change with an action that should be taken. The implementation policy is dynamic can be updated over the air. For example, the implementation policy can be transmitted to the mobile device when there is an update to the policy, when a request for the policy is received from the device, or combinations thereof. In accordance with some aspects, the implementation policy can be manually overridden (e.g., when there is physical access to the device).

At 708, approval or rejection of the recommended action is communicated to the mobile device. In accordance with some aspects, if the recommended action is rejected, an alternative action to be implemented is communicated to the mobile device. The recommended action or the alternative action can include limiting usage of the device to emergency usage, suspending a subset of applications running on the device, restricting at least one device action, and/or suspending device applications associated with the unauthorized change.

Figure 8:
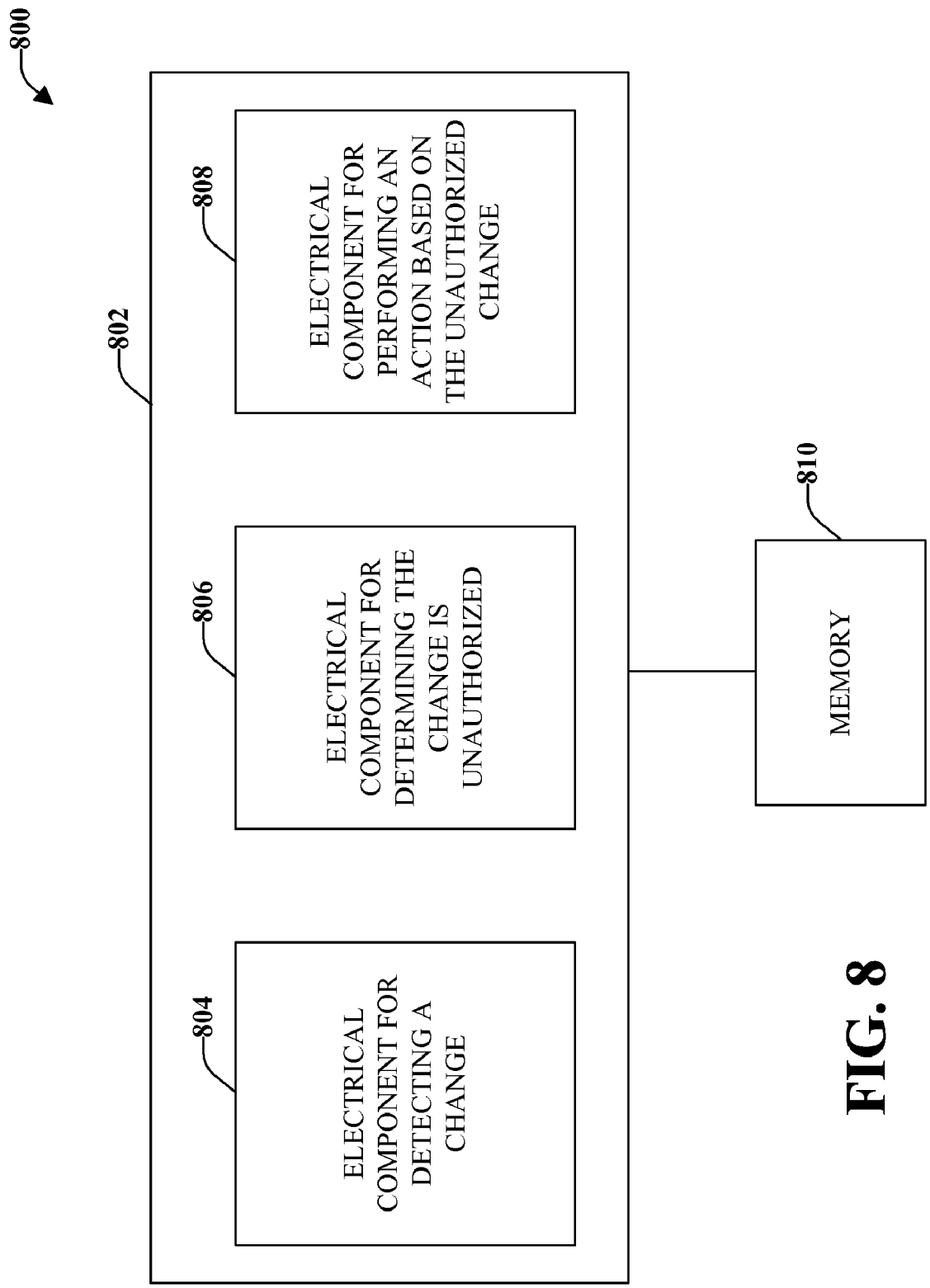
FIG. 8 illustrates an example system that diagnoses an unauthorized change.

With reference to FIG. 8, illustrated is an example system 800 that diagnoses an unauthorized change. It is to be appreciated that system 800 is represented as including functional blocks, which may be functional blocks that represent functions implemented by a processor, software, or combination thereof (e.g., firmware).

System 800 includes a logical grouping 802 of electrical components that can act separately or in conjunction. Logical grouping 802 may include an electrical component 804 for identifying a change on a device. Also included is an electrical component 806 for establishing that the change is unauthorized, which can be a function of a component identification, a behavior characteristic, or combinations thereof. The component identification can be determined from a dynamically updatable component identification listing.

Logical grouping 802 also includes an electrical component 808 for implementing an action based on the unauthorized change. The action can be performed based on an implementation policy that associates an action with an unauthorized change. In accordance with some aspects, the implementation policy is dynamically updateable over the air. Additionally or alternatively, the implementation policy is manually overridden.

The performed action can include limiting usage of the device to emergency usage, suspending a subset of applications running on the device, restricting at least one device action, suspending device applications associated with the unauthorized change, or combinations thereof. Additionally or alternatively, the performed action comprises logging and reporting information associated with the unauthorized change to a service provider, a user, or both the service provider and the user. Further, the performed action can include prompting a user to solve a connectivity problem during a specified amount of time and/or prompting the user for information associated with the unauthorized change.

According to some aspects, logical grouping 802 includes an electrical component for transmitting a recommended action to a service provider and an electrical component for receiving approval or rejection of the recommended action.

Additionally, system 800 can include a memory 810 that retains instructions for executing functions associated with electrical components 804, 806, and 808 or other components. While shown as being external to memory 1210, it is to be understood that one or more of electrical components 804, 806, and 808 may exist within memory 810.

Figure 9:
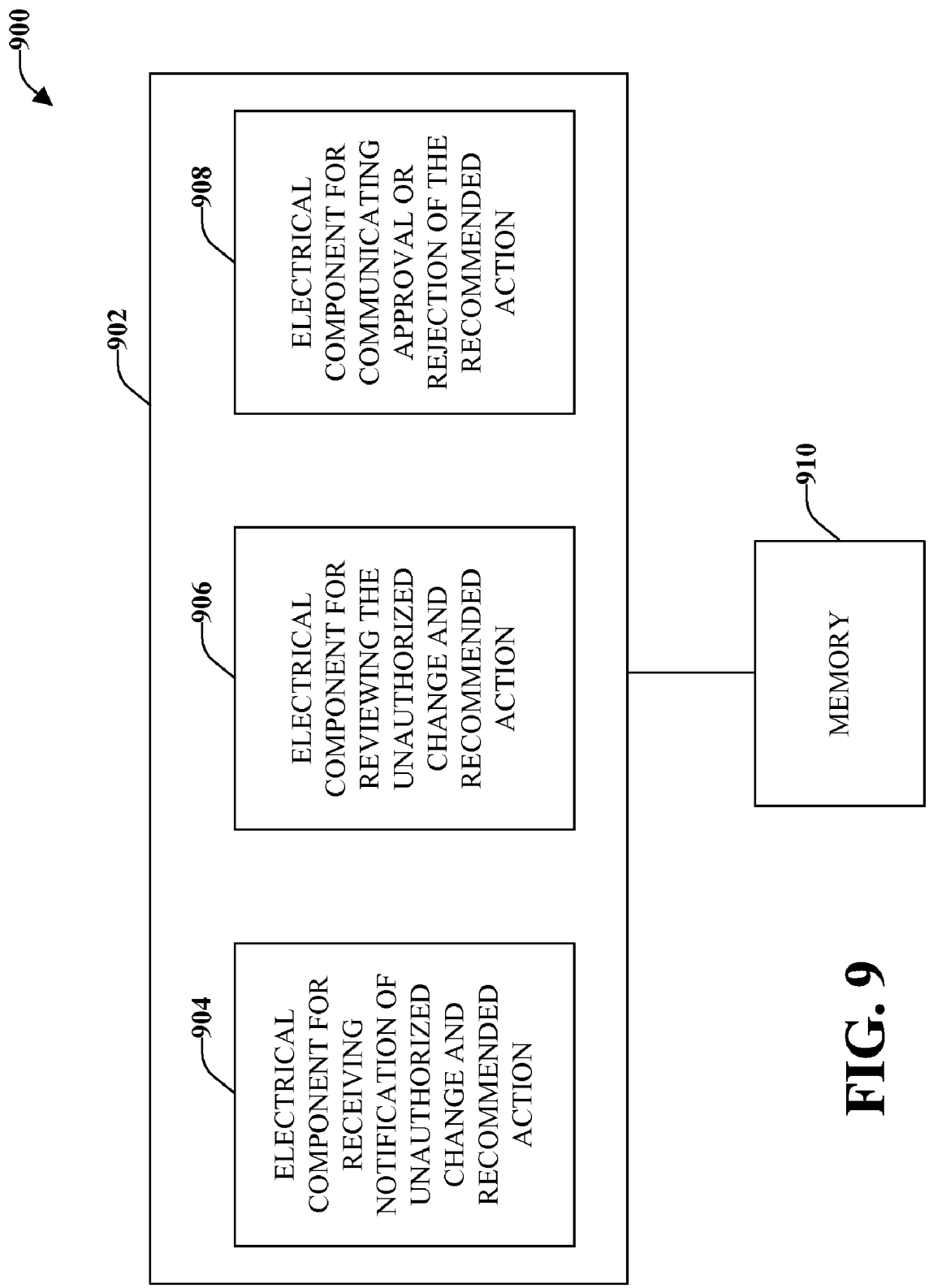
FIG. 9 illustrates an example system that remotely detects unauthorized changes on a device.

FIG. 9 illustrates an example system 900 that remotely detects unauthorized changes on a device. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. Logical grouping 902 includes an electrical component 904 for receiving notification that an unauthorized change has been made to a device. The notification can include a recommended action. The unauthorized change can be a hardware change, a circuitry change, or combinations thereof.

Logical grouping 902 also includes an electrical component 906 for reviewing the unauthorized change and the recommended action as a function of an implementation policy. The implementation policy can be communicated to the device when there are changes to the policy and/or when a request for the policy is received from the device.

Also included is an electrical component 908 for communicating approval or rejection of the recommended action to the device. Communication of the rejection can include an alternative action that should be implemented. The recommended action or the alternative action is at least one of limiting usage of the device to emergency usage, suspending a subset of applications running on the device, restricting at least one device action, or suspending device applications associated with the unauthorized change.

Additionally, system 900 can include a memory 910 that retains instructions for executing functions associated with electrical components 904, 906, and 908 or other components. While shown as being external to memory 910, it is to be understood that one or more of electrical components 904, 906, and 908 can exist within memory 910.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for diagnosing an unauthorized hardware change, comprising:
    detecting, by a computing device, a hardware change on a mobile device;
    determining the hardware change is an unauthorized hardware change as a function of a component identification of the hardware and a behavior characteristic of the hardware corresponding to the component identification, including determining that an actual behavior characteristic of the hardware is different from an authorized behavioral characteristic stored on the mobile device for the hardware; and
    performing an action based on an implementation policy that associates the action with the unauthorized hardware change, including:
    determining a connectivity problem in attempting to transmit a message over a network to report the unauthorized hardware changed,
    during a specified amount of time, prompting a user to solve the connectivity problem and prompting the user to provide information regarding the unauthorized hardware change,
    restricting usage of the mobile device after expiration of the specified amount of time if the connectivity problem is not resolved prior to the expiration of the specified amount of time or if the information regarding the unauthorized hardware change is not received prior to the expiration of the specified amount of time, and
    logging information associated with the unauthorized hardware change for reporting to a service provider.

2. The method of claim 1, wherein the component identification is determined by a dynamically updatable component identification listing.

3. The method of claim 1, further comprising:
    transmitting a recommended action for handling the unauthorized hardware change to the service provider; and
    receiving approval or rejection of the recommended action.

4. The method of claim 1, wherein the implementation policy is dynamically updateable over the air.

5. The method of claim 1, wherein the implementation policy is manually overridden.

6. The method of claim 1, wherein the performed action comprises limiting usage of the mobile device to emergency usage.

7. The method of claim 1, wherein the performed action comprises suspending a subset of applications running on the mobile device.

8. The method of claim 1, wherein the performed action comprises restricting at least one device action.

9. The method of claim 1, wherein the performed action comprises suspending device applications associated with the unauthorized hardware change.

10. The method of claim 1, wherein the performed action comprises reporting the logged information associated with the unauthorized hardware change to the service provider, the user, or both the service provider and the user.

11. A wireless communications apparatus, comprising:
    processor; and
    a memory that retains computer executable instructions that, when executed by the processor, cause the processor to perform the acts of:
    detecting a hardware change on a mobile device;
    ascertaining the hardware change is an unauthorized hardware change as a function of a component identification of the hardware and a behavior characteristic of the hardware corresponding to the component identification, including determining that an actual behavior characteristic of the hardware is different from an authorized behavioral characteristic stored on the mobile device for the hardware; and
    performing an action based on an implementation policy that associates the action with the unauthorized hardware change, including:
    determining a connectivity problem in attempting to transmit a message over a network to report the unauthorized hardware changed,
    during a specified amount of time, prompting a user to solve the connectivity problem and prompting the user to provide information regarding the unauthorized hardware change,
    restricting usage of the mobile device after expiration of the specified amount of time if the connectivity problem is not resolved prior to the expiration of the specified amount of time or if the information regarding the unauthorized hardware change is not received prior to the expiration of the specified amount of time, and logging information associated with the unauthorized hardware change for reporting to a service provider.

12. The wireless communications apparatus of claim 11, wherein the component identification is determined by a dynamically updatable component identification listing.

13. The wireless communications apparatus of claim 11, wherein the component identification is determined by a manually updatable component identification listing.

14. The wireless communications apparatus of claim 11, the memory further retains instructions related to reporting a recommended action to be implemented for handling the unauthorized hardware change to the service provider and receiving approval or rejection of the recommended action to be implemented.

15. The wireless communications apparatus of claim 11, wherein the implementation policy is dynamically updateable over the air.

16. The wireless communications apparatus of claim 11, wherein the performed action comprises limiting usage of the mobile device to emergency usage.

17. The wireless communications apparatus of claim 11, wherein the performed action comprises at least one of suspending a subset of applications running on the mobile device, restricting at least one device action, or suspending device applications associated with the unauthorized hardware change.

18. The wireless communications apparatus of claim 11, wherein the performed action comprises reporting the logged information associated with the unauthorized hardware change to the service provider, the user, or both the service provider and the user.

19. A wireless communications apparatus that detects an unauthorized hardware change to a device, comprising:
   means for identifying a hardware change to a device;
   means for establishing that the change is an unauthorized hardware change as a function of a component identification of the hardware and a behavior characteristic of the hardware corresponding to the component identification, including determining that an actual behavior characteristic of the hardware is different from an authorized behavioral characteristic stored on the device for the hardware; and
   means for performing an action based on an implementation policy that associates the action with the unauthorized hardware change, including:
   means for determining a connectivity problem in attempting to transmit a message over a network to report the unauthorized hardware changed,
   means for prompting a user to solve the connectivity problem and means for prompting the user to provide information regarding the unauthorized hardware change, during a specified amount of time;
   means for restricting usage of the mobile device after expiration of the specified amount of time if the connectivity problem is not resolved prior to the expiration of the specified amount of time or if the information regarding the unauthorized hardware change is not received prior to the expiration of the specified amount of time, and
   means for logging information associated with the unauthorized hardware change for reporting to a service provider.

20. The wireless communications apparatus of claim 19, wherein the component identification is determined by a dynamically updatable component identification listing.

21. The wireless communications apparatus of claim 19, further comprising:
   means for communicating a recommended action for handling the unauthorized hardware change to the service provider; and
   means for receiving approval or rejection of the recommended action.

22. The wireless communications apparatus of claim 19, wherein the performed action comprises at least one of limiting usage of the device to emergency usage, suspending a subset of applications running on the mobile device, restricting at least one device action, or suspending device applications associated with the unauthorized hardware change.

23. The wireless communications apparatus of claim 19, wherein the performed action comprises reporting the logged information associated with the unauthorized hardware change to the service provider, the user, or both the service provider and the user.

* * * * *